United States Patent
Igari et al.

(10) Patent No.: US 8,865,314 B2
(45) Date of Patent: Oct. 21, 2014

(54) PRESS MOLDING GLASS MATERIAL, MANUFACTURING METHOD THEREOF, AND MANUFACTURING METHOD OF OPTICAL ELEMENT

(75) Inventors: Takashi Igari, Shinjuku-ku (JP); Kenya Abiko, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 121 days.

(21) Appl. No.: 13/533,129

(22) Filed: Jun. 26, 2012

(65) Prior Publication Data
US 2012/0324956 A1    Dec. 27, 2012

(30) Foreign Application Priority Data
Jun. 27, 2011    (JP) ................... 2011-141455

(51) Int. Cl.
| | |
|---|---|
| B32B 17/06 | (2006.01) |
| C23C 14/34 | (2006.01) |
| C03B 23/00 | (2006.01) |
| B32B 7/02 | (2006.01) |
| C23C 14/10 | (2006.01) |
| C03B 11/08 | (2006.01) |
| C03C 17/34 | (2006.01) |
| C03B 11/14 | (2006.01) |
| C03C 17/23 | (2006.01) |

(52) U.S. Cl.
CPC ............ *C03B 11/08* (2013.01); *C03C 2217/228* (2013.01); *C03C 2217/22* (2013.01); *C03C 17/3417* (2013.01); *C03C 2217/229* (2013.01); *C03C 2217/216* (2013.01); *C03C 2217/212* (2013.01); *C03B 11/14* (2013.01); *C03B 2215/49* (2013.01); *C03C 17/23* (2013.01); *C03C 2217/213* (2013.01)

USPC ........ 428/432; 428/428; 428/216; 204/192.1; 65/102

(58) Field of Classification Search
None
See application file for complete search history.

(56) References Cited

U.S. PATENT DOCUMENTS

| | | | |
|---|---|---|---|
| 2010/0330378 A1* | 12/2010 | Takahashi et al. ............ | 428/428 |
| 2012/0135199 A1* | 5/2012 | Satou et al. .................... | 428/172 |
| 2012/0177914 A1* | 7/2012 | Igari et al. ..................... | 428/336 |

FOREIGN PATENT DOCUMENTS

| | | |
|---|---|---|
| JP | 2004-75529 A | 3/2004 |
| JP | 2005-239434 A | 9/2005 |

(Continued)

OTHER PUBLICATIONS

Office Action issued in corresponding Japanese Patent Application No. 2011-14155 dated Aug. 20, 2013.

*Primary Examiner* — David Sample
(74) *Attorney, Agent, or Firm* — Sughrue Mion, PLLC

(57) ABSTRACT

A press molding glass material including: a core portion composed of optical glass; and a surface layer covering the core portion, wherein the surface layer includes an outermost layer contacting with a molding surface of a molding die in press molding and an intermediate layer adjacent to the outermost layer, the outermost layer is a silicon oxide film having a surface free energy measured by a three-solution method of equal to or less than 75 mJ/m$^2$ and having a film thickness of less than 15 nm, and the intermediate layer is a film composed of a film material having a bond-radius difference from a silicon oxide based on a stoichiometric composition of more than 0.10 Å, wherein, in a case in which the bond-radius difference is more than 0.10 Å and equal to or less than 0.40 Å, a film thickness of the intermediate layer is equal to or less than 5 nm.

12 Claims, 2 Drawing Sheets

(56) References Cited

FOREIGN PATENT DOCUMENTS

| | | | |
|---|---|---|---|
| JP | 2011-001259 A | 1/2011 | |
| JP | 2011-001529 A | 1/2011 | |
| WO | WO 2010134546 A1 | * | 11/2010 |
| WO | WO 2011081031 A1 | * | 7/2011 |

* cited by examiner

PRESS MOLDING GLASS MATERIAL, MANUFACTURING METHOD THEREOF, AND MANUFACTURING METHOD OF OPTICAL ELEMENT

CROSS REFERENCES TO RELATED APPLICATIONS

This application claims the benefit of priority under 35 USC 119 to Japanese Patent Application No. 2011-141455, filed on Jun. 27, 2011, which is expressly incorporated herein by reference in its entirety.

BACKGROUND OF THE INVENTION

1. Field of the Invention

The present invention relates to a press molding glass material usable for obtaining a glass optical element by precision mold pressing and a manufacturing method thereof, and relates to a manufacturing method of an optical element using the abovementioned press molding glass material.

2. Description of the Related Art

As a method of manufacturing an optical element such as a glass lens or the like, there has been known a method of precisely press molding a press molding glass material (hereinafter, referred to also as "glass material" or "glass preform") by using an upper die and a lower die which have molding surfaces facing each other (referred to as "precision press molding method", "precision mold press method" or the like). This method is a method of obtaining a glass optical element by injecting optical glass solidified from a melt state to a predetermined shape or optical glass polishing-processed to a predetermined shape into the inside of a molding die and by thermally press-molding the optical glass.

In the precision press molding method, it is possible to form an optical functional surface by transcribing a precisely-processed molding surface of a molding die to a glass material, so that it is not necessary to carry out a machine process such as an optical grinding or the like for the construction of the optical functional surface after the press molding. Consequently, with the use of precision press molding method, it is possible to provide a high-performance lens inexpensively. However, in the precision press molding method, the press molding glass material and the molding surface of the molding die contact closely under a high-temperature state, so that an aspect in which a fusion occurs when a chemical reaction occurs at the interfacial surfaces thereof and the mold release property deteriorates becomes a problem.

For the procedure of improving the mold release property at the time of press molding, there has been proposed a procedure of covering the surface of the press molding glass material by an oxide film such as shown, for example, in Patent Document 1: Japanese examined patent publication H2-1779, Patent Document 2: Japanese unexamined patent publication H7-118025, Patent Document 3: Japanese unexamined patent publication H8-198631 and Patent Document 4: Japanese unexamined patent publication No. 2011-1259 or English language family member US2012/135199A1. The contents of the above applications are expressly incorporated herein by reference in their entirety.

In the Patent Documents 1 to 4, there is disclosed a silicon oxide film as an oxide film covering the surface of the press molding glass material, but according to the investigation of the present inventors, it was still not possible for the conventional silicon oxide film disclosed in the Patent Documents 1 to 4 to adequately suppress the fusion between the glass molding material for press molding and the die.

On the other hand, with regard to a press molding glass material including a silicon oxide film on the surface thereof, Japanese unexamined patent publication No. 2011-136870, published on Jul. 14, 2011, which is expressly incorporated herein by reference in its entirety, describes that there can be seen good correlation between the surface free energy measured by a three-solution method and the yield in press molding and that it is possible to improve the yield in press molding depending on a material whose surface free energy measured by a three-solution method is equal to or less than 75 mJ/m$^2$ within glass materials for press molding including silicon oxide films on the surfaces thereof, the thickness of which is less than 15 nm.

In the press molding glass material described in the previous application mentioned above, the film thickness of the abovementioned silicon oxide film is defined to be less than 15 nm in order to suppress the fusion with respect to the molding die. However, as a result of an investigation of the present inventors, it became clear, in order to obtain a molded glass body with a desired shape, that in a case in which it is necessary to deform the press molding glass material largely in press molding, there sometimes exists a case, in the press molding glass material described in the abovementioned previous application, in which it is difficult to obtain the molded glass body with a desired shape.

SUMMARY OF THE INVENTION

The present invention is addressed to provide a press molding glass material in which regardless of the amount of the glass deformation in the press molding, it is made possible to obtain a molded glass body with a desired shape while repressing the fusion with respect to the molding die.

As a result after the present inventors repeatedly devoted themselves to the investigations, it was possible to reach a situation in which the following renewed knowledge was obtained.

In the press molding glass material described in the abovementioned Japanese unexamined patent publication No. 2011-136870, as one of the reasons for the fact that it is difficult to obtain a molded glass body with a desired shape in a case in which the glass should be largely deformed by the press molding, there can be pointed out a phenomenon in which the film cannot follow the glass deformation, a film tearing (crack) occurs, and it becomes impossible to obtain an effect of fusion depression by the film.

Consequently, it is conceivable that the film thickness is to be thickened so as not to bring about the film tearing, but as a result of an investigation of the present inventors, it became clear that even if the abovementioned silicon oxide film is thickened to have film thickness of equal to or more than 15 nm, it is difficult to obtain a molded glass body with a desired shape. About this phenomenon, the present inventors presumes that it is because when the film thickness of the abovementioned silicon oxide film becomes equal to or more than 15 nm, the quantum size effect thereof disappears and it becomes difficult for the film to stretch, and as a result thereof, the deformation resistance (shearing resistance) become large and it becomes difficult to deform the glass while the film follows thereto. On the other hand, when trying to deform the glass by adding a large press pressure which is superior to the abovementioned deformation resistance, there occurs a phenomenon in which a film tearing occurs.

In view of the aspect mentioned above, the present inventors repeated considerable number of tests and faults in order to find out a procedure for applying easiness of stretching to the silicon oxide film described in the abovementioned previous application, by which it is possible to follow the large deformation of the glass in press molding, without changing the film thickness thereof. As a result thereof, the inventors newly found out a fact that by providing an intermediate layer composed of a predetermined film material as a layer adjacent to the silicon oxide film between the core-portion glass and the silicon oxide film, it is possible to cover the core-portion glass by a multi-layered film having easiness of stretching which is sufficient for following the large deformation of the glass, and the inventors reached a situation in which the present invention was completed.

An aspect of the present invention relates to a press molding glass material including a core portion composed of optical glass, and a surface layer covering the core portion, wherein the surface layer includes an outermost layer which contacts a molding surface of a molding die in press molding, and an intermediate layer adjacent to the outermost layer, the outermost layer is a silicon oxide film having a surface free energy measured by a three-solution method of equal to or less than 75 mJ/m$^2$ and having a film thickness of less than 15 nm, and the intermediate layer is a film composed of a film material having a bond-radius difference from a silicon oxide based on a stoichiometric composition of more than 0.10 Å, and in this regard, in a case in which the bond-radius difference is more than 0.10 Å and also is equal to or less than 0.40 Å, the film thickness thereof is equal to or less than 5 nm.

In an embodiment, the intermediate layer is an oxide film of zirconium, bismuth, yttrium, lanthanoid, zinc or titanium, and in this regard, in a case in which the intermediate layer is the oxide film of zinc or the oxide film of titanium, the film thickness thereof is equal to or less than 5 nm.

In an embodiment, the hydrogen binding energy of the outermost layer, which is measured by the three-solution method, is equal to or less than 39.0 mJ/m$^2$.

In an embodiment, the press molding glass material has a shape such that an outside-diameter changing rate calculated by the following formula (A) becomes equal to or more than 40% with respect to a molded glass body obtained by press molding:

Outside-Diameter Changing Rate (%)=|1−(Outside Diameter of Molded Glass Body/Outside Diameter of Press molding glass material)|×100      <Formula (A)>

In an embodiment, the press molding glass material is used for obtaining, by press molding, a molded glass body including an optical function portion and a flange portion surrounding the optical function portion.

In an embodiment, the optical glass includes at least one kind of easily reducible component selected from the group consisting of W, Ti, Bi and Nb.

A further aspect of the present invention relates to a manufacturing method of the above press molding glass material. In the manufacturing method, the outermost layer is formed by carrying out a film forming process using a film formation material composed of SiO$_2$ under a mixed gas atmosphere of oxygen and an inert gas. The oxygen content rate in the mixed gas atmosphere ranges from equal to or more than 5 volume % to less than 20 volume %.

In an embodiment, the manufacturing method further includes forming the intermediate layer by a film forming process in an atmosphere containing oxygen.

In an embodiment, the film forming process is carried out by a sputtering method.

A still further aspect of the present invention relates to a manufacturing method of an optical element, including: heating the above press molding glass material; obtaining a molded glass body by press molding with the use of a press molding die; and obtaining the optical element as the molded glass body itself or by subjecting the molded glass body to post-processing.

In an embodiment, in the above press molding, the outside-diameter changing rate calculated by the following formula (A) is equal to or more than 40%:

Outside-Diameter Changing Rate (%)=|1−(Outside Diameter of Molded Glass Body/Outside Diameter of Press molding glass material)|×100      <Formula (A)>

In an embodiment, a molded glass body, which includes an optical function portion and a flange portion surrounding the optical function portion, is obtained by the press molding.

According to the present invention, it becomes possible to obtain a molded glass body with a desired shape by precision press molding.

Other exemplary embodiments and advantages of the present invention may be ascertained by reviewing the present disclosure and the accompanying drawing.

BRIEF DESCRIPTION OF THE DRAWINGS

The present invention will be described in the following text by the exemplary, non-limiting embodiments shown in the figure, wherein.

DESCRIPTION OF THE EMBODIMENTS

Figure 1:
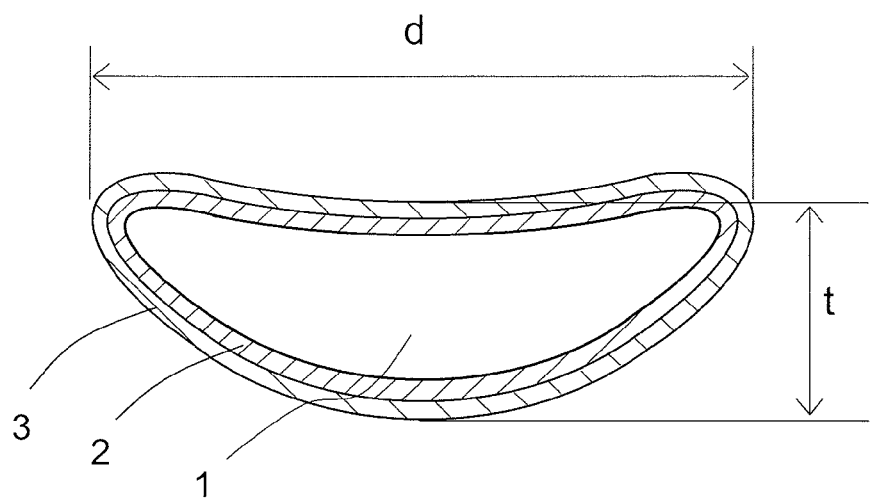
FIG. 1 is a cross-sectional view expressing one configuration of a press molding glass material relating to an aspect of the present invention.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

[Press Molding Glass Material]

A press molding glass material, which may be referred to as a glass material for press molding, of the present invention includes a core portion composed of optical glass and a surface layer covering the core portion. In this context, the surface layer includes an outermost layer which contacts a molding surface of a molding die in press molding, and an intermediate layer adjacent to the outermost layer, the outermost layer is a silicon oxide film having a surface free energy measured by a three-solution method of equal to or less than 75 mJ/m² and having a film thickness of less than 15 nm, and the intermediate layer is a film composed of a film material having a bond-radius difference from a silicon oxide based on the stoichiometric composition of more than 0.10 Å, and in this regard, in a case in which the bond-radius difference is more than 0.10 Å and also is equal to or less than 0.40 Å, the film thickness thereof is equal to or less than 5 nm.

With the use of the press molding glass material of the present invention mentioned above, it is possible to suppress fusion between the press molding glass material and the molding die in press molding and thus, it is possible to achieve improvement in yield and to mass-produce high-quality optical elements. Further, it becomes possible also to prolong the die lifetime. Consequently, with the use of the press molding glass material of the present invention, it is possible, in the manufacture of an optical element by precision press molding, to improve productivity remarkably.

Further, with respect to the press molding glass material of the present invention, even in a case in which the optical glass at the core portion should be greatly deformed by press molding, it is possible for the surface layer thereof to conform to the deformation of the core portion. Insufficient conformity of the surface layer makes it difficult to obtain a molded glass body with a desired shape because of deformation deficiency or deformation defect or because of occurrence of cracks in the surface layer, whereas with the use of the press molding glass material of the present invention, it becomes possible to strike a balance between a desired deformation amount and prevention of fusion and to obtain a molded glass body with a desired shape.

The press molding glass material of the present invention has, as a surface layer covering a core portion composed of optical glass, a multi-layered film including at least an outermost layer which contacts a molding surface of a molding die in press molding and an intermediate layer adjacent to the outermost layer. The abovementioned multi-layered film is a film which makes it possible to strike a balance between a desired deformation amount and prevention of fusion at least by the combination of the outermost layer and the intermediate layer, which will be described in detail hereinafter.

Hereinafter, there will be explained the abovementioned multi-layered film in further detail.

The outermost layer of the surface layer, which contacts the molding surface of the molding die in press molding, that is, the outermost layer of the press molding glass material of the present invention is a silicon oxide film. The surface free energy of the silicon oxide film measured by a three-solution method is equal to or less than 75 mJ/m². When the above-mentioned surface free energy is equal to or less than 75 mJ/m², it is possible to carry out precision press molding without bringing about fusion between the press molding glass material and the molding die, so that it is possible to achieve yield improvement in the manufacture of optical elements and improvement in die lifetime. On the other hand, when the abovementioned surface free energy exceeds 75 mJ/m², fusion between the press molding glass material and the molding die noticeably occurs in precision press molding, so that the productivity in the precision press molding decreases significantly. From a viewpoint of suppressing fusion with the molding die more effectively, the abovementioned surface free energy is more preferably equal to or less than 72 mJ/m², even more preferably equal to or less than 70 mJ/m². The lower the abovementioned surface free energy is, the more preferable it is from a viewpoint of suppression of fusion between the press molding glass material and the molding die, and although the lower limit thereof is not particularly limited, for example, according to a manufacturing method of a press molding glass material of the present invention which will be later described, it is possible to manufacture a press molding glass material of around 50 mJ/m² as the abovementioned surface free energy.

Hereinafter, there will be explained the surface free energy measured by the three-solution method, which is used as an index of the surface property of the abovementioned silicon oxide film in the present invention.

The surface free energy measured by a two-solution method is given by the sum of the dispersion force of the solid or liquid and the polar interaction force of the solid or liquid (see, for example, Japanese unexamined patent publication No. 2005-225707 by the present inventors, which is expressly incorporated herein by reference in its entirety). On the other hand, the surface free energy measured by a three-solution method is afforded by extending the Fowkes theory concerning nonpolar intermolecular force so as to deal further with components by polar or hydrogen-bonding intermolecular force, and according to this extended Fowkes theory, the surface free energy γ of each substance is given, as shown in the following formula (1), by the sum of a nonpolar component (dispersion component) $\gamma^a$ and a polar component composed of a hydrogen bond component $\gamma^b$ and a dipole component $\gamma^c$.

$$\gamma = \gamma^a + \gamma^b + \gamma^c \quad (1)$$

Further, the following formula (2) is established between the contact angle and each component.

$$\gamma_L(1+\cos\theta) = 2\sqrt{\gamma_S^a \gamma_L^a} + 2\sqrt{\gamma_S^b \gamma_L^b} + 2\sqrt{\gamma_S^c \gamma_L^c} \quad (2)$$

In the abovementioned formula (2), $\gamma_L$ indicates the surface free energy of a liquid, which is expressed by $\gamma_L^a + \gamma_L^b + \gamma_L^C$. $\gamma_L^a$ indicates the dispersion component of the surface free energy of the liquid. $\gamma_L^b$ indicates the dipole component of the surface free energy of the liquid. $\gamma_L^C$ indicates the hydrogen bond component of the surface free energy of the liquid. $\gamma_S^a$ indicates the dispersion component of the surface free energy of the solid. $\gamma_S^b$ indicates the dipole component of the surface free energy of the solid. $\gamma_S^C$ indicates the hydrogen bond component of the surface free energy of the solid. θ indicates the contact angle.

In the present invention, the following three kinds of liquids are used as standard substances, and the surface free energy calculated by working out respective components according to a 3×3 determinant constituted by contact angles thereof and respective parameters is defined as the surface free energy by the three-solution method.

TABLE 1

| Standard Substance | Parameter | | | |
|---|---|---|---|---|
| | Dispersion Component (mJ/m$^2$) | Dipole (mJ/m$^2$) | Hydrogen Bond (mJ/m$^2$) | Total (mJ/m$^2$) |
| Ultrapure Water | 21.8 | 25.5 | 25.5 | 72.8 |
| Glycerine | 34 | 5.3 | 42.5 | 81.8 |
| Diiodomethane | 50.8 | 0 | 0 | 50.8 |

With respect to the silicon oxide film constituting the outermost layer, the composition thereof is not particularly limited, provided that the surface free energy measured by the three-solution method is equal to or less than 75 mJ/m$^2$. With regard to the composition of the silicon oxide film, a film containing silicon dioxide ($SiO_2$) which has a stoichiometric composition is stable, but it is not to be limited to $SiO_2$, and in case of assuming that the composition is $Si_xO_y$, one in which y/x=about 1 to about 3, for example, is allowed to exist.

In this context, according to an investigation by the present inventors, inclusion of a larger amount of oxygen than in a silicon oxide film formed by a conventional film forming method makes it possible to decrease the surface free energy of the silicon oxide film by the three-solution method. More specifically, when the oxygen becomes excessive with respect to the stoichiometric composition, the surface free energy by the three-solution method decreases compared with the silicon oxide film ($SiO_2$ film) of the stoichiometric composition. Then, the silicon oxide film, the surface free energy by the three-solution method of which is equal to or less than 75 mJ/m$^2$, makes it possible to suppress fusion between the molding die and the press molding glass material in press molding, and it also became clear as a result of an investigation by the present inventors that this decrease in surface free energy is caused mainly by a decrease in hydrogen-bonding energy. Specifically, with respect to the silicon oxide film constituting the outermost layer of the press molding glass material of the present invention, it is possible for the hydrogen-bonding energy measured by the three-solution method to be equal to or less than 39.0 mJ/m$^2$, for example, to be equal to or more than 30.0 mJ/m$^2$ and equal to or less than 39.0 mJ/m$^2$.

The film thickness of the abovementioned silicon oxide film included in the press molding glass material of the present invention is made to be less than 15 nm. This is because film tearing or deformation defect will occur as previously explained when the film thickness of the abovementioned silicon oxide film is equal to or more than 15 nm. The lower limit value of the abovementioned film thickness is, preferably, equal to or more than 1 nm. When the film thickness is less than 1 nm, the silicon oxide film goes locally missing and is formed in an island shape, whereas when the film thickness is equal to or more than 1 nm, uniform film formation is possible. The upper limit value is less than 15 nm as mentioned above, and from a viewpoint of reducing the influence exerted on the optical property of the optical element obtained after the press molding, it is preferably 7.5 nm±5.5 nm, more preferably 5.0 nm±3.0 nm, even more preferably 5.0 nm±2.0 nm.

In this context, the film thickness of each layer in the present invention means the film thickness over the region of the core portion which is to form an optical function portion in an optical element manufactured from the molded glass body obtained by press-molding the press molding glass material of the present invention. The optical function portion means an area within an effective diameter in an optical lens, for example. Although it depends on the forming method of the oxide film, there is a case in which the film thickness T1 of the oxide film at the place serving as the optical function portion and the film thickness T2 of the oxide film over the peripheral portion of the outer circumference side are different from each other, with a tendency being T1≧T2. In a case in which T1 and T2 are different, the film thickness specified in the present invention is T1. It is possible to measure the abovementioned film thickness, for example, by subjecting a cross-section of the glass material to elemental analysis. Alternatively, it is also possible to specify the film thickness based on the film formation condition of the oxide film.

Next, there will be explained the intermediate layer adjacent to the abovementioned silicon oxide film.

As explained previously, the present inventors newly found out a fact that by providing, as an intermediate layer which forms a surface layer lying adjacent to the silicon oxide film, a film composed of a film material constituting the silicon oxide film, that is, a film material which satisfies a predetermined relationship with respect to the silicon oxide, it is possible to furnish the surface layer with such sufficient stretchability as conforms to great deformation of the glass, and as a result thereof, even in a case in which the amount of deformation in press molding is great, it becomes possible to carry out excellent press molding without bringing about a deformation defect or film tearing, and the present inventors reached completion of the present invention. It is conceivable that this is due to the fact that it is possible to decrease the shearing resistance of the whole surface layer by forming the silicon oxide film and the abovementioned intermediate layer to be multi-layered, and with respect to this point, the present inventors presume the following mechanism.

The surface layer of the press molding glass material exhibits a quantum size effect when pressed and behaves like liquid (functions as a so-called liquid thin film) and as the result thereof, it is conceivable that it is possible for the surface layer to conform to deformation of the optical glass at the core portion. The present inventors considered that the shearing resistance of this liquid thin film varies while attaining a maximum and a minimum periodically and that the period of this shearing resistance depends on the bond radius of the film material. Based on that knowledge, the present inventors reached an assumption that an increase in the shearing resistance of one film can be cancelled out by a decrease in the shearing resistance of the other film by forming a multi-layered film from two kinds of film materials whose bond radii are different, thereby making it possible to obtain a multi-layered film (surface layer) having a low shearing resistance, and thus there was selection of a film material to be multi-layered with the silicon oxide film based on the difference in bond radius. As a result thereof, by forming the silicon oxide film, which is the outermost layer, so as to be multi-layered with a film material constituting the silicon oxide film, that is, with a film composed of a film material satisfying the following relationship with the silicon oxide, it becomes possible to obtain a molded glass body with a desired shape, as shown in the inventive examples mentioned below, without bringing about a deformation defect or film tearing, which has led to completion of the present invention. Specifically, the inventors carried out film material selection for the intermediate layer based on the following criteria.

Based on the bond radius of a stoichiometric composition, with respect to the covalent bond radius (1.61 Å) of a silicon oxide ($SiO_2$) of a stoichiometric composition, the following items are taken into account.

(1) Film materials which are equal to or less than 0.10 Å in bond-radius difference of stoichiometric composition cannot be used as intermediate layer film materials.
(2) Film materials which are more than 0.10 Å and also are equal to or less than 0.40 Å(preferably, equal to or more than 0.20 Å and equal to or less than 0.40 Å) in bond-radius difference of stoichiometric composition are usable as intermediate layer film materials if they are equal to or less than 5 nm in film thickness.
(3) Film materials which are more than 0.40 Å(preferably, equal to or more than 0.50 Å and equal to or less than 0.90 Å) in bond-radius difference of the stoichiometric composition are usable as intermediate layer film materials regardless of the film thicknesses thereof.

In this context, in the abovementioned item (2), the reason why the film thickness is restricted to equal to or less than 5 nm is that if it is more than 5 nm, it is not possible to form a surface layer which exhibits such stretchability as can conform to great deformation of the glass, and with respect to this point, the present inventors assume that a major cause thereof is that the periodical variation difference in the shearing resistances of the multi-layered films themselves becomes small in a case in which the bond-radius difference is relatively small as in the abovementioned item (2) and as a result thereof, the effect of reducing the shearing resistance of the whole surface layer due to the multi-layering becomes low. If the film thickness is made thin, it is possible to decrease the mutual bound energy inside the intermediate layer, in other words, it is possible to increase the quantum size effect and therefore, according to the inventors' consideration, the capability of reducing the shearing resistance of the whole surface layer is the reason why the film thickness should be made to be equal to or less than 5 nm with respect to the intermediate layer composed of a film material satisfying the relationship shown in the abovementioned item (2).

The bond radius of the stoichiometric composition explained above is construed as, for example, "covalent bond radius", "ion bond radius", "Van der Waals radius" or "metal bond radius" based on the bond pattern between atoms in the film. Any one of these bond radii is a value described in well-known documents and also, it is possible to calculate the value easily by various kinds of calculation software or by document values described in chemical handbooks or the like.

Specifically, as intermediate layer film materials corresponding to the abovementioned item (2), it is possible to cite zinc oxides and titanium oxides, and as intermediate layer film materials corresponding to the abovementioned item (3), it is possible to cite zirconium oxides, bismuth oxides, yttrium oxides and lanthanoid oxides. The fact that a desired object of the present invention can be achieved by selecting any of these oxide films as the intermediate layer and by multi-layering it with the silicon oxide film is demonstrated in the inventive examples described later.

It is preferable for the film thickness of the intermediate layer to be set at equal to or more than 1 nm from such a viewpoint, as explained with respect to the outermost layer previously, that uniform film formation is possible. The upper-limit value thereof, regarding the aspect of the abovementioned item (2), is 5 nm as explained previously. With respect to the upper-limit value of the thickness of the intermediate layer film in the aspect of the abovementioned item (3), it was confirmed in an inventive example described later that a desired effect could be obtained even if the film thickness exceeded 5 nm (for example, a film thickness of around 10 nm). It is not preferable from a viewpoint of productivity if a long period of time is required for the film formation, so that when considering productivity, the film thickness of the intermediate layer in the aspect of the abovementioned item (3) is preferably equal to or less than 10 nm.

Next, there will be explained the optical glass constituting the core portion of the press molding glass material of the present invention.

Provided that the press molding glass material of the present invention has the abovementioned surface layer, the glass type of the optical glass constituting the core portion is not particularly limited, but for the following reason, the press molding glass material of the present invention has high usefulness in an aspect in which the core portion thereof is optical glass containing at least one kind of easily reducible component selected from the group consisting of W, Ti, Bi and Nb.

In the past, as the surface layer for suppressing fusion between the press molding glass material and the molding die, a carbon-based thin film has been used (for example, see Japanese unexamined patent publication H8-217468, Japanese unexamined patent publication H8-259241 or Japanese unexamined patent publication H9-286625, which are expressly incorporated herein by reference in their entirety). On the other hand, in order to achieve a high refractive index required for glass lens in recent years, there are increasing needs for production of an optical element such as optical lens or the like from optical glass containing W, Ti, Bi, Nb or the like which is a high refractive-index imparting component. However, the optical glass containing the abovementioned high refractive-index imparting component easily reacts with a carbon-based thin film under a high-temperature environment in press molding and as a result thereof, tarnish or flaw-like reaction trace arises on the surface of the obtained molded glass body and fusion arises with respect to the molding surface, so that an optical element deficient in exterior performance is easily produced. It is conceivable that this is caused by the fact that the aforementioned high refractive-index imparting component is an easily reducible component and thus can take a plurality of valences while present as a glass component, thereby easily inducing oxidation-reduction reaction, and various kinds of interfacial reactions occur in the course of deformation while contacted under pressure by the molding die in a process of press molding.

As opposed to this, the surface layers for the press molding glass material of the present invention are layers constituted by oxide films and these layers are deficient in reactivity with the abovementioned high refractive-index imparting component (which is also an easily reducible component). Therefore, even in the press molding to the optical glass containing the abovementioned high refractive-index imparting component, it is possible to avoid occurrence of defects stemming from reaction between the high refractive-index imparting component and the film material.

From the reason mentioned above, it is preferable for the optical glass constituting the core portion of the press molding glass material of the present invention to contain at least one kind of easily reducible component selected from the group consisting of W, Ti, Bi and Nb. In particular, when the amount of the abovementioned easily reducible component contained is equal to or more than 5 mol % in total (for example, 10 mol % to 65 mol %, more preferably 15 mol % to 55 mol %), application of the present invention is effective. Among the optical glasses containing the abovementioned easily reducible component, phosphoric acid-based optical glass and boric acid-based glass, in particular, can be cited as glasses which easily react with the carbon-based thin film and make it difficult to prevent fusion with the molding die when using the carbon-based thin film. Consequently, it is particularly preferable for the present invention to employ a press molding glass material, in which any of these glasses is used as the core portion. As such phosphoric acid-based optical glass, optical glass can be cited which includes, by mol % indication, $P_2O_5$: 10% to 45%, $Nb_2O_5$: 3 to 35%, $Li_2O$: 0% to 35%, $TiO_2$: 0% to 25%, $WO_3$: 0% to 20%, $Bi_2O_3$: 0% to 40%, $B_2O_3$: 0% to 20%, BaO: 0% to 25%, ZnO: 0% to 25%, $Na_2O$: 0% to 50%, $K_2O$: 0% to 20%, $Al_2O_3$: 0% to 15%, $SiO_2$: 0% to 15% (the total amount of $WO_3$, $TiO_2$, $Bi_2O_3$ and $Nb_2O_5$ occupies equal to or more than 10% but less than 65%), and F: 0% to 10% with respect to the total oxygen amount, which is described in Japanese unexamined patent publication No. 2011-1259. For details of the glass, Paragraphs [0031] to [0051] of the Japanese unexamined patent publication No. 2011-1259 can be referred to. Also, as the boric acid-based optical glass, boric acid bismuth-based optical glass can be cited which is described in Paragraphs [0012] to [0134] of Japanese unexamined patent publication No. 2009-40647, which is expressly incorporated herein by reference in its entirety, for example, boric acid bismuth-based optical glass which contains, by cation % indication, 30% to 70% $Bi^{3+}$, 5% to 50% $B^{3+}$, 0.5% to 50% $Si^{4+}$, 1% to 20% $Al^{3+}$, 0.5% to 20% $Ca^{2+}$, 0% to 15% $Mg^{2+}$, 0% to 10% $Sr^{2+}$, in which the total amount of $Ca^{2+}$, $Mg^{2+}$ and $Sr^{2+}$ contained is 1% to 20% and $Al^{3+}/(Ca^{2+}+Mg^{2+}+Sr^{2+})$ is 0.2 to 20 by cation ratio.

It is possible for the shape of the core portion constituting the press molding glass material of the present invention to be any of various kinds of shapes such as a sphere shape, an ellipse shape, a convex meniscus shape, a concave and convex shape and the like. On the other hand, as a shape with heightened usefulness for an optical element, a shape provided with a flange portion around the optical function portion can be cited. Specifically, it is a shape in which a flat portion perpendicular to the optical axis is provided around at least one of first and second optical functional surfaces of the optical element. Regarding imaging apparatuses for which miniaturization has been promoted in recent years such as digital cameras and camera-attached cellular phones, it is necessary to constitute the imaging optical system by a plurality of ultrasmall lenses and to position and fix each lens precisely. In such an imaging optical system, the abovementioned flange portion serves as a joint surface and a positioning reference surface between the lenses themselves, so that with the use of the optical element having the abovementioned flange portion, it is possible to realize a miniaturized high performance lens unit at low cost. However, it is significantly disadvantageous in terms of cost to form a shape corresponding to the flange portion onto a glass preform, so that this is generally not employed. Consequently, generally, by press-molding a glass preform which does not include a flange portion at the peripheral portion, whose shape is a sphere shape, an ellipse shape, a convex meniscus shape, a concave and convex shape or the like, an optical element having the abovementioned flange portion is obtained. In this case, regarding the shapes of the glass preform and the molded glass body obtained by press-molding this preform, the difference in outside diameter, in particular, is significant. Consequently, in order to deform the outside diameter greatly, the deformation amount in press molding should be great, but as explained previously, it is difficult for the silicon oxide film alone to conform to this deformation without bringing about film tearing. As opposed to this, the press molding glass material of the present invention has a surface layer in which the silicon oxide film and a predetermined intermediate layer are multi-layered, so that even in a case in which the deformation amount in press molding is large, it is possible to strike a balance between suppression of fusion by the surface layer and a desired deformation amount.

Specifically, with the use of the press molding glass material of the present invention, it is possible to carry out press molding satisfactorily with a large deformation amount, in which the outside-diameter changing rate calculated by the following formula (A) becomes equal to or more than 40%, and to obtain a molded glass body with a desired shape.

Outside-Diameter Changing Rate (%)=|1−(Outside Diameter of Molded Glass Body/Outside Diameter of Press molding glass material)|×100    <Formula (A)>

For example, in a case in which it is assumed that the outside-diameter size of the glass material before the press molding is 10.0 mm and the outside-diameter size of the molded glass body after the press is 15.0 mm, the outside-diameter changing rate is 50% as derived from the formula (A).

There is no limitation in particular on the upper-limit value of the abovementioned outside-diameter deformation rate, and it is possible for the value, for example, to be equal to or less than 60%, further to be equal to or less than 55%, or to be equal to or less than 50%.

Also, with regard to the deformation amount of the center thickness, it is preferable for the center-thickness change rate calculated by the following formula (B) to be equal to or more than 1% and to be equal to or more than 5%.

Center-Thickness Change Rate (%)=|1−(Center Thickness of Molded Glass Body/Center Thickness of Press molding glass material)|×100    <Formula (B)>

This is because when the change rate of the center thickness becomes less than 1%, there sometimes occurs a case in which gas accumulation arises between the main surface of the glass preform and the molding surface of the molding die and the surface accuracy of the molded glass body decreases. It should be noted, in the press molding for obtaining an optical element having a shape with a flange portion around the optical function portion, that generally the change rate is equal to or less than 50% and, further, is equal to or less than 30%, or is equal to or less than 20%.

FIG. 1 is a cross-sectional view of a glass material relating to the present invention. In FIG. 1, the reference symbol d denotes an outer-shape size of the glass material and the reference symbol t indicates the center thickness. The glass material includes, for example, a core portion 1 composed of a multi-component optical glass containing any of various kinds of components such as the abovementioned easily reducible component and the like, an outermost layer 3 and an intermediate layer 2 adjacent to the outermost layer 3.

Figure 2:
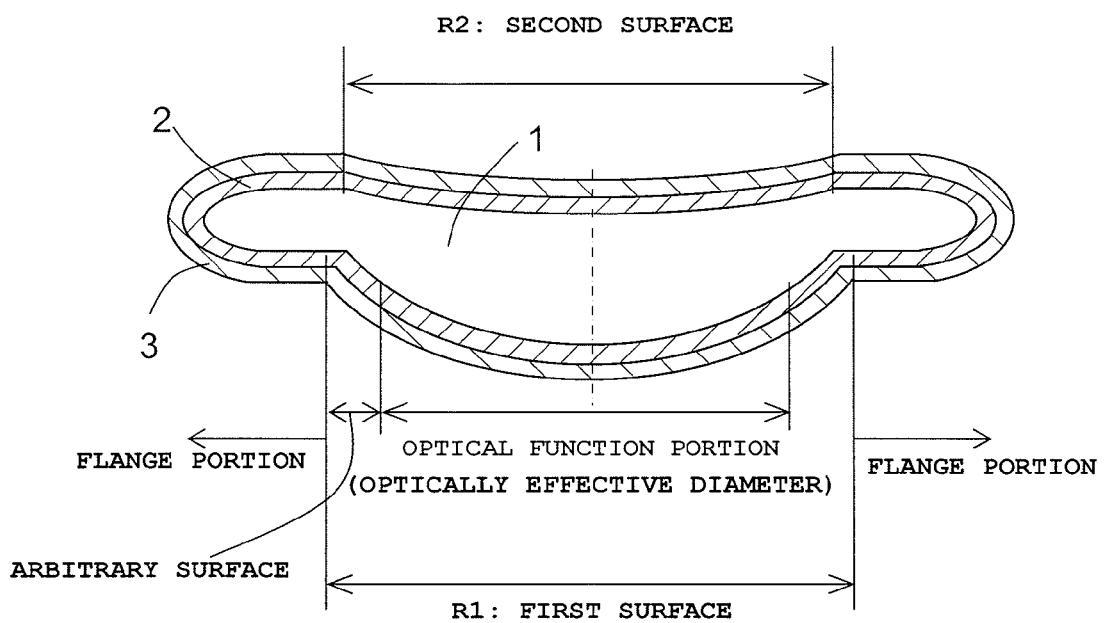
FIG. 2 is a cross-sectional view of a molded glass body which is press-molded by using the press molding glass material shown in FIG. 1.

FIG. 2 is a cross-sectional view of a molded glass body formed by press-molding the glass material shown in FIG. 1, in which due to the press molding, the center thickness t of the molded glass body is thinner than the center thickness t of the glass material and the outside diameter size d thereof is larger than the outside diameter size d of the glass material. It should be noted that over the whole surface of the press molded body, there are formed the outermost layer 3 and the intermediate layer 2. Regarding the molded glass body shown in FIG. 2, there is formed a flange portion around the optical function portion with respect to both a first surface R1 and a second surface R2. In this context, the optical function portion means an area within the optically effective diameter and is constituted by a non-spherical surface or a spherical surface. In the aspect shown in FIG. 2, an arbitrary surface shape is formed in the area outside the optically effective diameter. In other words, the first surface and the second surface are constituted by the optical function portion and the arbitrary surface surrounding the optical function portion. Then, the flange portion is provided so as to surround the outer circumference of the arbitrary surface. The flange portion in the present invention is allowed to be connected with the optical function portion through the arbitrary surface as mentioned above and also, the optical function portion and the flange portion are allowed to be directly connected. In that case, the first surface and the second surface serve as the optical function portion itself. In the aspect shown in FIG. 2, the flange portion on the first surface side and the flange portion on the second surface side are flat surfaces parallel to each other and the outer circumferences of these flat surfaces are connected by outer-circumference end surfaces (curved surfaces). In FIG. 2, there is shown an aspect in which the flange portion on the first surface side and the flange portion on the second surface side are flat surfaces parallel to each other, but it is allowed to employ a shape which tapers toward the outer circumference of the molded glass body and it is allowed for either of the flat surfaces on the first surface side and on the second surface side to be perpendicular to the outside diameter center line and for the other flat surface to be inclined. Also, the arbitrary surface provided between the optical function portion and the flange portion is allowed to be a flat surface.

Figure 3:
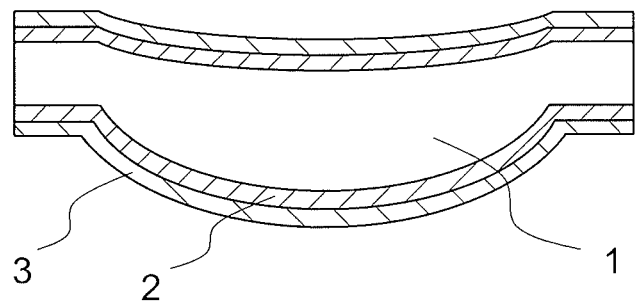
FIG. 3 is a cross-sectional view of a glass optical element which is obtained from the molded glass body shown in FIG. 2.

It is possible for the molded glass body shown in FIG. 2 to be formed into the glass optical element shown in FIG. 3 by being subjected to coring (grinding) at the peripheral portion thereof. At the outer-circumference end surface ground by the coring, the surface layer thereof is removed as well.

Next, there will be explained preforming of the core portion of the press molding glass material of the present invention.

It is possible for the press molding glass material of the present invention to be produced using a material obtained by preforming glass, which serves as the core portion 1, so as to have a predetermined volume and a predetermined shape. It is possible to carry out this preforming, for example, by preforming glass, cut out from block-shaped optical glass, so as to have a predetermined volume and a predetermined shape by grinding and/or polishing.

Alternatively, from a pipe, optical glass in a molten state is dripped or separated while made to flow down, thereby obtaining a predetermined amount of a glass mass, and preforming may be performed while cooling this glass mass. Here, it is possible to employ a method in which the glass in a molten state is received on a receiving die which jets gas from the bottom portion thereof and preforming is performed while cooling the glass in a substantially floated state. This method is preferable for the reason that the production efficiency is high and a glass material having a smooth surface can be obtained. For example, in case of molding a core portion of a glass material such as is shown in FIG. 1, it is possible to obtain a core portion of a glass material having a convex surface and a concave surface by pressing a die having a convex surface onto molten glass placed on a receiving die, deforming the upper surface of the glass into a concave shape and carrying out cooling.

Regarding the press molding glass material of the present invention, the surface of the preformed body composed of the optical glass serving as the core portion 1 preformed as mentioned above is covered by the surface layer which is the multi-layered film mentioned above. As the covering method, it is possible to use a well-known film forming method such as a sputtering method, a vacuum deposition method or the like. The surface free energy of the outermost layer of the press molding glass material of the present invention, which is measured by the three-solution method, can be controlled by a film formation condition and details thereof will be described later. An arbitrary layer is allowed to intervene between the core portion and the surface layer, but it is preferable for the intervening layer to be constituted by a material whose covalent bond radius is different from that of the film material constituting the adjacent layer so as not to heighten the shearing resistance of the surface layer. As the criteria for film material selection here, it is possible to also apply aforementioned items (1) to (3).

[Manufacturing Method of Press Molding Glass Material]

A further aspect of the present invention relates to a manufacturing method of the aforementioned press molding glass material of the present invention. The manufacturing method of the press molding glass material of the present invention is a method in which the aforementioned outermost layer is formed by carrying out a film forming process using a film formation material composed of $SiO_2$ under a mixed gas atmosphere of oxygen and an inert gas, wherein the oxygen content rate thereof ranges from equal to or more than 5 volume % to less than 20 volume %.

With the use of the press molding glass material obtained by forming on the outermost layer a silicone carbide film, deposited under the abovementioned atmosphere containing oxygen by equal to or more than 5 volume % and less than 20 volume % using a film formation material composed of $SiO_2$, it is possible to improve the yield in press molding. It is inferred that this is caused by the fact that the silicon oxide film formed by the abovementioned film formation condition lies in a state of including a lot of oxygen compared with a silicone carbide film formed by a conventional film forming method in the past and the surface free energy measured by the three-solution method decreases compared with that of the press molding glass material having a silicon oxide film in the past. More specifically, it is possible for the manufacturing method of the press molding glass material of the present invention to produce a silicon oxide film having a surface free energy of equal to or less than 75 $mJ/m^2$, which is measured by the three-solution method, by carrying out a film forming process under a mixed gas atmosphere containing the abovementioned predetermined amount of oxygen. However, for the reason explained previously, the film thickness of the abovementioned silicon oxide film is made less than 15 nm.

In the manufacturing method of the press molding glass material of the present invention, the film forming process of the silicon oxide film is carried out under an atmosphere in which oxygen is contained by equal to or more than 5 volume % and less than 20 volume % in an inert gas such as argon or the like. In any of the case in which the oxygen content rate of the atmosphere for carrying out the film forming process is less than 5 volume % and the case in which the rate exceeds 20 volume %, it becomes difficult, when carrying out press molding by using the obtained press molding glass material, to suppress fusion between the press molding glass material and a molding die. With respect to the case in which the oxygen content rate is less than 5 volume %, the foregoing is thought to be caused by the fact that the oxygen content rate of the silicon oxide film to be formed is small and thus the surface free energy measured by the three-solution method is high; with respect to the case in which the oxygen content rate is more than 20 volume %, the foregoing is thought to be caused by the fact that the surface free energy measured by the three-solution method becomes high, which stems from that the higher-order structure at the surface of the press molding glass material becomes unstable and reaction is activated. It is preferable for the abovementioned oxygen content rate to be between equal to or more than 5 volume % and equal to or less than 15 volume % from a viewpoint of suppressing fusion more effectively. As the inert gas which is included in the abovementioned atmosphere and which is a component other than oxygen, it is possible to cite argon gas, helium gas, neon gas, xenon gas or the like.

It is possible for the film forming process to be carried out using a film formation material composed of $SiO_2$ as the film formation material preferably by a sputtering method more preferably by a PVD method. Specifically, it is possible to form the silicon oxide film by a PVD method using a sputtering gas in which oxygen is contained by equal to or more than 5 volume % and less than 20 volume % in an the inert gas, with $SiO_2$ (for example, silica glass) being used as a target base material. As a more specific film forming method of the silicon oxide film, it is possible to use the following method. That is to say, a plurality of film-formed objects (optical glasses) in which an intermediate layer is formed on the core portion are aligned on a tray and arranged inside a vacuum chamber, and while performing vacuum air evacuation inside the vacuum chamber, the film-formed objects are heated to approximately 300° C. by a heating heater. The air evacuation is carried out until the degree of vacuum inside the vacuum chamber becomes equal to or less than $1\times10^{-5}$ Torr and thereafter, a sputtering gas in which oxygen is contained by equal to or more than 5 volume % and less than 20 volume % in inert gas is introduced, and by applying a high-frequency wave to the target base material (silica glass) inside the vacuum chamber so as to convert the raw material to plasma, and the silicon oxide film is formed on the intermediate layer surface which is positioned at the outermost layer of the film-formed object. It is preferable for the output in film formation to be 100 W to 300 W, for the sputtering gas flowing amount to be 20 sccm to 100 sccm and for the atmospheric temperature in film formation to be 350° C. to 370° C. Note that it is possible for the film thickness of the silicon oxide film to be controlled to a desired range by adjusting the pressure (degree of vacuum) inside the vacuum chamber, the output (supply power) and the film formation period.

In the manufacturing method of the press molding glass material of the present invention, a film formation material composed of $SiO_2$ is used. In this context, the film formation material composed of $SiO_2$ means that it is not a material intentionally mixed with a component other than $SiO_2$ and it is allowed for the material to contain impurities mixed in the preparation process of $SiO_2$. It is a material the $SiO_2$ purity of which is preferably equal to or more than 95 weight %, more preferably equal to or more than 98 weight %, further preferably equal to or more than 99 weight %. The silicon oxide film at the outermost layer, formed on the film-formed object by using such a film formation material, is a film the $SiO_2$ purity of which is equal to or more than 95 weight %, more preferably equal to or more than 98 weight %, further preferably equal to or more than 99 weight %.

It is possible for the formation of the intermediate layer to be carried out by a well-known film forming method such as a sputtering method, a vacuum deposition method or the like. It should be noted that there sometimes happens a case in which the film is colored if the formation of the intermediate layer is carried out in an atmosphere of 100% inert gas, so that it is preferable also for the film formation of the intermediate layer to be carried out, similarly to the film formation of the aforementioned silicon oxide film, in an oxygen-containing atmosphere, for example, under an atmosphere in which oxygen is contained by equal to or more than 5 volume % and less than 20 volume % in the inert gas.

[Manufacturing Method of Optical Element]

The manufacturing method of the optical element of the present invention is a method including heating the press molding glass material of the present invention, obtaining a molded glass body by press molding with the use of a press molding die, and obtaining the aforementioned optical element as the aforementioned molded glass body itself or by subjecting the molded glass body to post-processing. It is preferable for the abovementioned press molding to be carried out by a precision press molding method for the reason of obtaining a high-quality optical element inexpensively as explained previously.

The precision press molding method is referred to also as a mold optics molding method and is already well known in the technical field to which this invention belongs. The surface which transmits, refracts, diffracts, reflects, etc. a ray of the optical element is referred to as an optical functional surface. Take a lens for an example, a lens surface such as a non-spherical surface of a non-spherical surface lens, a spherical surface of a spherical surface lens or the like corresponds to the optical functional surface. The precision press molding method is a method of forming an optical functional surface by means of press molding by transferring a molding surface of a press molding die to glass precisely. In other words, it is not necessary to apply a mechanical process such as grinding, polishing or the like to finish the optical functional surface.

As the molding die used in the precision press molding, it is possible to use a molding die obtained by precisely processing a material which has sufficient heat resistance and stiffness and which is intricate. As the material of the molding die, it is possible to cite, for example, silicon carbide, silicon nitride, tungsten carbide, aluminum oxide, titanium carbide, metal such as stainless steel, or any of these materials whose surface is covered by a film of carbon, refractory metal, precious metal alloy, carbide, nitride, boride or the like.

As the molding die, it is also possible to use a die including a coating film such as carbon-containing film on the molding surface serving as the contact surface with the press molding glass material. As the carbon-containing film, it is preferable to use a film constituted by a single-component or composite layer of non-crystalline and/or crystalline graphite and/or diamond. It is possible for this carbon film to be formed by a procedure such as a sputtering method, a plasma CVD method, a CVD method, an ion plating method or the like. For example, it is possible to form the film by a sputtering by using an inert gas such as Ar as the sputtering gas and by using graphite as the sputtering target. Alternatively, it is allowed to form the film using methane gas and hydrogen gas as raw material gases by a microwave plasma CVD method. In case of forming the film by an ion plating method, benzene gas is used with ionization. These carbon films include those having C—H bonds. It should be noted that by providing the carbon-containing film on the molding surface of the molding die, it becomes possible to prevent fusion between the press molding glass material and the molding die in press molding even further, in which case it is preferable to carry out pressing under a non-oxidizing atmosphere for the purpose of preventing oxidation of the carbon in press molding. However, there is such an inconvenience, under the non-oxidizing atmosphere, that the abovementioned easily reducible component is more easily reducible and moreover, interfacial reaction between the glass and the carbon occurs easily. On the other hand, if there is employed a press molding glass material of the present invention including the aforementioned surface layer, the glass at the core-portion and the carbon-containing film on the molding surface do not directly contact each other in press molding, so that there is also such an advantage that even if pressing is carried out under a non-oxidizing atmosphere such as nitrogen gas or the like, it is possible to suppress interfacial reaction between the glass and the carbon.

Specifically, it is possible to carry out the precision press molding, for example, according to such a method as follows.

Figure 4:
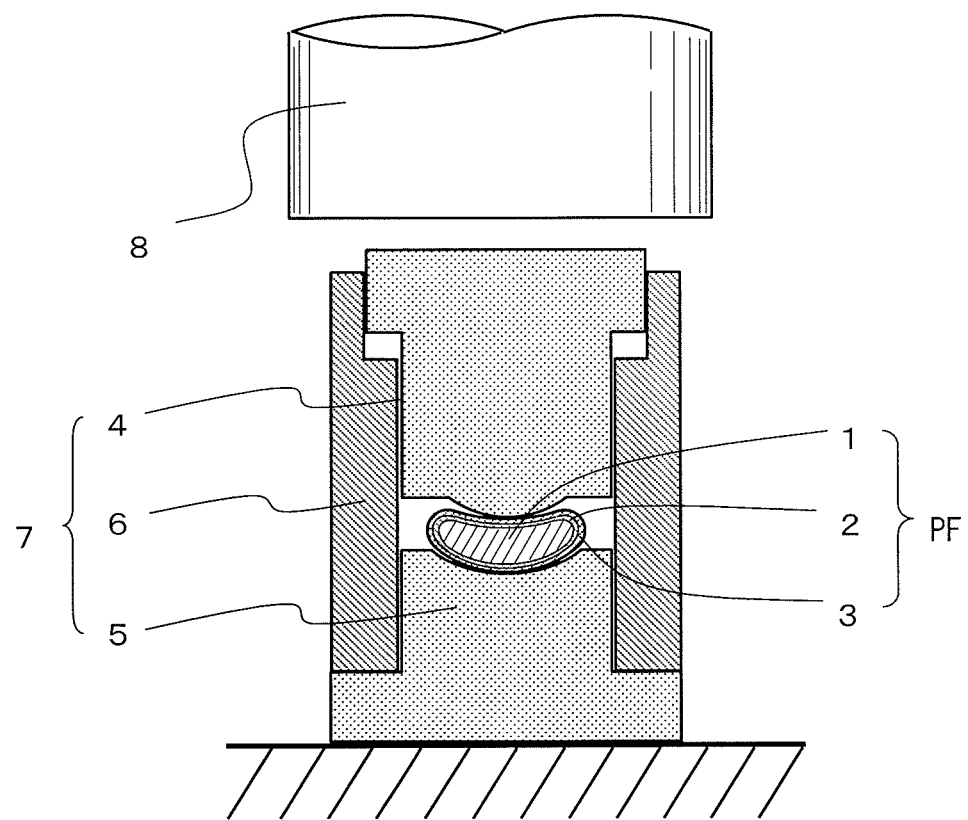
FIG. 4 is an explanatory view showing one configuration of a precision press molding method.

On an occasion of press molding, as shown in FIG. 4, a press molding glass material PF is supplied inside a molding die 7 including an upper die 4, a lower die 5 and a die body 6, and the temperature is raised to a temperature range suitable for pressing. For example, the heating temperature is appropriately set based on the kind of the optical glass of the core portion 1, and it is preferable to carry out the press molding when the press molding glass material PF and the molding die 7 lie in a temperature range in which the viscosity of the press molding glass material PF becomes $10^5$ dPa·s to $10^{10}$ dPa·s. It is preferable for the press temperature to be a temperature at which, for example, the optical glass constituting the core portion 1 becomes an equivalent of $10^{7.2}$ dPa·s or so and such setting that the temperature at which the core portion 1 becomes an equivalent of $10^{7.2}$ dPa·s is made to be equal to or less than 800° C., preferably equal to or less than 750° C., more preferably equal to or less than 650° C. can become an index for selecting the glass. It is possible for the press molding to be carried out by lowering a press head 8 and applying a predetermined load onto the glass material PF lying between the upper die 4 and the lower die 5.

It is allowed for the press molding to be carried out by introducing the press molding glass material PF into the molding die 7 and by heating the press molding glass material PF and the molding die 7 together to the press molding temperature, and it is also allowed to carry out the press molding by introducing a heated press molding glass material PF into the preheated molding die 7. The former method tends to cause fusion because the contact time period between the press molding glass material and the molding die is long compared with that of the latter method, but according to the present invention, even in case of employing the abovementioned method, it is possible to carry out the precision press molding without bringing about fusion. On the other hand, in case of employing the latter method, it is allowed to employ a method in which the press molding glass material PF is raised to the temperature equivalent to a glass viscosity of $10^5$ dPa·s to $10^9$ dPa·s and the molding die 7 is raised to the temperature equivalent to a glass viscosity of $10^9$ dPa·s to $10^{12}$ dPa·s, and in which after arranging the press molding glass material PF in the molding die 7, the material is press-molded immediately. It is possible for this method to reduce the temperature variation of the molding die comparatively, so that it is possible to shorten the temperature-rising and temperature-lowering cycle time of the molding apparatus and concurrently, it is preferable in that there is an effect of suppressing degradation caused by the heat of the molding die 7. In any case, cooling is started at the starting time or after the starting time of the press molding, and while employing a proper load applying schedule and maintaining the close contact between the molding surface and the glass device, the temperature is lowered. Thereafter, the formed body is taken out by mold release. It is preferable for the mold release temperature to be a temperature equivalent to a glass viscosity of $10^{12.5}$ dPa·s to $10^{13.5}$ dPa·s.

Over the released molded glass body, there exists a surface layer on the surface thereof similarly to that of the press molding glass material before the pressing. The molded glass body obtained by the press molding includes a silicon oxide film on the outermost surface, so that the amount of silicon oxide contained is large compared with a body which does not include the silicon oxide film and thus, there is obtained such a characteristic that is excellent in chemical endurance property. It should be noted that the film thickness of the surface layer does not substantially change by the press molding.

It is possible to ship the obtained molded glass body directly as an optical element which is a final product, and alternatively, it is also possible to produce a final product after subjecting it to post-processing such as coring or film forming process for forming on the surface an optical function film such as a reflection preventing film. For example, it is possible to form a desired antireflection film on the molded glass body including the aforementioned surface layer by appropriately depositing a material such as $Al_2O_3$, $ZrO_2$—$TiO_2$, $MgF_2$ or the like as a single layer or as a laminated layer. It is possible to carry out the film forming method of the antireflection film according to a well-known method such as a deposition method, an ion assist deposition method, an ion plating method, a sputtering method or the like. For example, in case of depending on the deposition method, it is possible to form the antireflection film by heating a deposition material by means of electron beams, direct electric-energization or arc in a vacuum atmosphere of around $10^{-4}$ Torr with the use of a deposition apparatus and by transporting vapor of a material, which is generated by evaporation and sublimation from the material, onto a base material and by condensing and precipitating the vapor. It is possible for the base material heating temperature to be approximately between room temperature and 400° C. However, in a case in which the glass transition temperature (Tg) of the base material is equal to or less than 450° C., it is preferable to set the upper-limit temperature for heating of the base material to be Tg−50° C. It should be noted that the silicon oxide film which exists on the outermost surface of the molded glass body obtained after the press molding has a high affinity with the antireflection film. Consequently, there is also such an effect that the antireflection film hardly exfoliate.

It is possible for the glass optical element obtained according to the present invention to serve as a light-weight lens having a small diameter and a small thickness such as, for example, a lens for a small-sized imaging system, which is mounted on a portable imaging apparatus or the like, a lens for communication, an objective lens for an optical pickup, a collimating lens and the like. The lens shape is not limited in particular and it is possible to employ various kinds of shapes such as a convex meniscus lens, a concave meniscus lens, a biconvex lens, a biconcave lens and the like. In addition, as mentioned above, it is also possible for the glass optical element obtained according to the present invention to include a flange portion (flat portion) which functions as a joint surface between the lenses themselves around the optical function portion and as a positioning reference surface, at least on one of the first surface and the second surface. According to the present invention, it is possible to obtain a glass optical element including such a flange portion without bringing about deformation-defect or fusion in the press deformation.

EXAMPLES

The present invention will be described in detail below based on Examples. However, the present invention is not limited to Examples.

A. Examples and Comparative Examples Having Different Film Materials and Film Thicknesses for Intermediate Layers

Example 1

1. Production of Press Molding Glass Material (1) Preforming of Core Portion Glass The optical glass having a composition described in the following Table 2 was dripped onto a receiving die from a molten state and was cooled, and there was preformed a glass mass (core portion of glass material) having a shape, in which one side was a convex surface and the opposite side was a concave surface, as shown in FIG. 1. The outside-diameter size of the core-portion glass was 8.8 mm and the center thickness was 1.6 mm.

TABLE 2

|  | mol % |
|---|---|
| $B_2O_3$ | 2.0 |
| $P_2O_5$ | 25.5 |
| $Al_2O_3$ | 0 |
| $Li_2O$ | 6.0 |
| $Na_2O$ | 10.5 |
| $K_2O$ | 2.0 |
| BaO | 1.0 |
| ZnO | 0 |
| $TiO_2$ | 7.0 |
| $Nb_2O_3$ | 18.0 |
| $WO_3$ | 8.0 |
| $Bi_2O_3$ | 20.0 |
| Ti + Nb + W + Bi | 53 |
| Total | 100 |
| Refractive Index | 2.0031 |
| Abbe Number | 19.1 |
| Glass Transition Temperature Tg (° C.) | 488 |
| Sag Temperature Ts (° C.) | 537 |

(2) Formation of Intermediate Layer

Subsequently, zirconium oxide films having various kinds of film thicknesses which are shown in Table 4 were formed on the surface of the core portion of the glass material by the following method.

More specifically, by using a sputtering apparatus provided with a tray holding a plurality of core portions and a chamber (sputtering chamber) housing a target base material (here, Zr) which faced that tray, formation of zirconium oxide film was carried out by a sputtering method. First, the core portion of the glass material arranged on the tray was pre-heated to a surface temperature of around 200° C. on the outside of the chamber and thereafter, was transported to the inside of the chamber. Subsequently, while performing vacuum air evacuation inside the chamber, the glass core portion was heated to a surface temperature of around 300° C. by a heating heater. After being exhausted until the degree of vacuum in the inside of the chamber becomes equal to or less than $1 \times 10^{-5}$ Torr, a mixed gas of oxygen and argon containing oxygen of 10 volume % was introduced as a sputtering gas, the high frequency output was set at 250 W, thereafter, the target base material was subjected to sputtering by Ar ion, and the target Zr was attached and deposited onto the surface of the core-portion glass as an oxidative product. Thereafter, the inside of the chamber was cooled and the glass material after the film formation was taken out together with the tray. The film thickness is controlled by the sputtering time period.

(3) Formation of Outermost Layer

Subsequently, on the zirconium oxide film formed in the abovementioned item (2), a silicon oxide film was formed by the following method.

More specifically, by using the sputtering apparatus provided with a tray which holds a plurality of the film-formed objects in which the intermediate layer was formed on the core portion thereof and a chamber (sputtering chamber) housing a target base material (here, silica glass having purity equal to or more than 99 weight %) which faced to this tray, film formation of silicon oxide was performed by a sputtering method. Firstly, the film-formed object arranged on the tray was pre-heated to around 200° C. of surface temperature and thereafter, was transported into the chamber. Next, while performing vacuum air evacuation inside the chamber, the film-formed object was heated to around 300° C. in surface temperature by a heating heater. After performing air evacuation until the degree of vacuum in the inside of the chamber became equal to or less than $1 \times 10^{-5}$ Torr, the mixed gas of oxygen and argon containing oxygen of 10 volume % was introduced as a sputtering gas, the high frequency output was set at 250 W, the target base material was subjected to sputtering by Ar ion and was attached and deposited onto the zirconium oxide film surface of the outermost layer of the film-formed object. Thereafter, the inside of the chamber was cooled and the glass material after the film formation was taken out together with the tray.

2. Evaluation of Outermost Layer (1) Measurement of Surface Free Energy

The outermost surface of the press molding glass material which was produced in the abovementioned item "1.", that is, the surface free energy by the three-solution method of the silicon oxide film surface of the outermost layer was measured by the following method.

Firstly, the ultrapure water, the glycerine and the diiodomethane which are described in Table 1 were dripped onto the produced press molding glass material respectively and the respective contact angles $\theta_1$, $\theta_2$, $\theta_3$ were measured.

Next, the parameters and the measured contact angles of the respective liquids described in Table 1 were substituted for the following inverse determinant.

$$\begin{bmatrix} \gamma_s^a \\ \gamma_s^b \\ \gamma_s^c \end{bmatrix} = \begin{bmatrix} 2\sqrt{21.8} & 2\sqrt{25.5} & 2\sqrt{25.5} \\ 2\sqrt{34} & 2\sqrt{5.3} & 2\sqrt{42.5} \\ 2\sqrt{50.8} & 2\sqrt{0} & 2\sqrt{0} \end{bmatrix}^{-1} \begin{bmatrix} 72.8(1+\cos\theta_1) \\ 81.8(1+\cos\theta_2) \\ 50.8(1+\cos\theta_3) \end{bmatrix}$$

Thus, the dispersion component $\gamma_s^a$, the same dipole component $\gamma_s^b$ and the same hydrogen bond component $\gamma_s^c$ of the surface of the produced press molding glass material were worked out.

Finally, surface free energy $\gamma_S$ of the press molding glass material produced from the abovementioned result was calculated by the following formula.

$$\gamma_S = \gamma_s^a + \gamma_s^b + \gamma_s^c$$

Regardless of the film thickness of the zirconium oxide film, the measured surface free energy was 68.2 mJ/m² and the nonpolar energy, the hydrogen-bonding energy and the dipole energy which were the components were values shown in the following Table 3.

TABLE 3

| Surface Free Energy | Nonpolar Energy | Hydrogen Binding Energy | Dipole Energy |
|---|---|---|---|
| 68.2 mJ/m$^2$ | 35.3 mJ/m$^2$ | 31.1 mJ/m$^2$ | 1.8 mJ/m$^2$ |

(2) Identification of Outermost Layer and Film Thickness Measurement

When the identification of the outermost layer and the film thickness measurement were carried out by a similar method to that of the item "3." mentioned below, it was confirmed that the outermost layer was the silicon oxide film and the film thickness thereof was 5 nm.

The outermost layer was formed by a similar condition and a method also in Examples 2 to 9 mentioned below, so that the composition, the surface property and the film thickness of the formed outermost layer became similar to those of Example 1.

3. Identification of Intermediate Layer and Calculation of Film Thickness

In the abovementioned item "1." and "(2)", with respect to the film thickness of the intermediate layer formed on the surface of the core-portion glass, masking was applied to a portion of a flat plate glass and a film was formed on the flat plate glass by the same condition as that on an occasion of forming the intermediate layer on the core-portion glass and thereafter, the mask was removed, and the film thickness, measured by observing the height difference between the film forming portion and the mask portion with an atomic force microscope (AFM), was made to be the film thickness of the intermediate layer formed on the core-portion glass. The identification of the intermediate layer was carried out by executing a composition analysis of the surface at the abovementioned film forming portion by using an X-ray photo electron spectrometer (XPS) attached to a scanning electron microscope (SEM) or by using an energy dispersion type X-ray spectroscopy (EDX). In the respective Examples, it was confirmed that the intermediate layers were constituted by materials shown in Table 4 described below and had the film thicknesses shown in Table 4 described below.

4. Production of Glass Lens

Subsequently, the abovementioned respective glass materials were press-molded under a nitrogen gas atmosphere by a mold press-molding apparatus shown in FIG. 4. More specifically, first, by using a molding die composed of upper and lower dies made of SiC, in which the carbon-containing mold release films were formed on the molding surfaces by a sputtering method, and composed of a die body holding these upper and lower dies coaxially, the glass material was supplied to the inside of the molding die so as to sandwich and hold the abovementioned glass material PF by the upper and lower dies. Then, the molding die was thrown inside the chamber of the molding apparatus in which the atmosphere was filled with non-oxidative N$_2$ gas, and the molding die and the glass material PF were heated to a temperature in a range between the deformation point Ts+40° C. and the deformation point Ts−10° C. of the glass material PF. Subsequently, the molding die was pressurized by 180 kg/cm$^2$ to 260 kg/cm$^2$ and concurrently, the molding die was cooled by a predetermined cooling speed and the pressurization was terminated at a time point when the temperature of the molding die became 460° C. Subsequently, the molding die was cooled rapidly and when the temperature became equal to or less than 180° C., the molding die was taken out from the inside of the chamber, and the molded glass body in the inside of the molding die was taken out by decomposing the molding die.

5. Evaluation of Glass Lens

In case of using the molding die used in the abovementioned item "4.", if it is possible to carry out the press molding with the desired deformation amount, the formed body to be obtained has a shape including the flange at the circumference of the optical function portion as shown by the cross-sectional shape in FIG. 2, in which the outside-diameter size d is 13.00 mm, the center thickness is 1.40 mm, the outside-diameter changing rate by the press molding becomes 47.0% and the change rate of the center thickness becomes 14.0%.

The shape of each glass lens obtained by the abovementioned item "4." was measured by a thickness measurement apparatus installed in the molding apparatus and it was judged as a non-defective product if the center thickness was equal to or less than 1.40 mm and judged as a defective product if it exceeded 1.40 mm, and also, as a result of taking out the glass lens from the molding apparatus and measuring the outside diameter, it was judged as a non-defective product if the outside-diameter size was equal to or more than 13.00 mm and judged as the defective product if it was less than 13.00 mm, in which it was evaluated as "OK" for the non-defective product and as "NG" for the defective product.

Example 2

Except an aspect in which the target used for the intermediate layer formation was made to be Bi, the press molding glass material was obtained by a method similar to that of Example 1. With regard to the obtained press molding glass material, similar processes as those of the items "3." to "5." in Example 1 were carried out.

Example 3

Except an aspect in which the target used for the intermediate layer formation was made to be Y, the press molding glass material was obtained by a method similar to that of Example 1. With regard to the obtained press molding glass material, similar processes as those of the items "3." to "5." in Example 1 were carried out with respect to the obtained press molding glass material.

Example 4

Except an aspect in which the target used for the intermediate layer formation was made to be La, the press molding glass material was obtained by a method similar to that of Example 1. With regard to the obtained press molding glass material, similar processes as those of the items "3." to "5." in Example 1 were carried out with respect to the obtained press molding glass material.

Example 5

Except an aspect in which the target used for the intermediate layer formation was made to be Zn, the press molding glass material was obtained by a method similar to that of Example 1. With regard to the obtained press molding glass material, similar processes as those of the items "3." to "5." in Example 1 were carried out with respect to the obtained press molding glass material.

Example 6

Except an aspect in which the target used for the intermediate layer formation was made to be Ti, the press molding glass material was obtained by a method similar to that of Example 1. With regard to the obtained press molding glass material, similar processes to those of the items "3." to "5." in Example 1 were carried out with respect to the obtained press molding glass material.

Example 7

Except an aspect in which the target used for the intermediate layer formation was made to be Cr, the press molding glass material was obtained by a method similar to that of Example 1. With regard to the obtained press molding glass material, similar processes as those of the items "3." to "5." in Example 1 were carried out with respect to the obtained press molding glass material.

Example 8

Except an aspect in which the target used for the intermediate layer formation was made to be SiN, the press molding glass material was obtained by a method similar to that of Example 1. With regard to the obtained press molding glass material, similar processes as those of the items "3." to "5." in Example 1 were carried out with respect to the obtained press molding glass material.

Example 9

Except an aspect in which the target used for the intermediate layer formation was made to be SiC, the press molding glass material was obtained by a method similar to that of Example 1. With regard to the obtained press molding glass material, similar processes as those of the items "3." to "5." in Example 1 were carried out with respect to the obtained press molding glass material.

The results mentioned above are shown in the following Table 4.

Evaluation Result

In Examples 1 to 4, it was possible to obtain non-defective products without shape defects by the press molding regardless of the film thickness of the intermediate layer.

On the other hand, in Examples 5 and 6, it was possible to obtain non-defective products in a situation in which the film thickness of the intermediate layer was 5 nm or less, but in Examples 7 to 9, it was not possible to obtain non-defective products regardless of the film thickness of the intermediate layer.

The bond-radius difference shown in Table 4 indicates difference between the covalent bond radius of the stoichiometric composition shown in the following Table 5 and the covalent bond radius of the stoichiometric composition of the silicon oxide film which is a film material of the outermost layer, with respect to the intermediate layer film material used in each Example. From the correspondence between the bond-radius difference shown in Table 4 and the evaluation result, it is possible to confirm the validity of the selection criteria for the aforementioned intermediate layer film material and the validity of the shearing-resistance reduction mechanism which is estimated by the present inventors.

TABLE 5

| Film Material (Stoichiometric Composition) | Bond Radius [Å] | Bond-Radius Difference [Å] |
|---|---|---|
| SiC | 1.56 | 0.05 |
| SiN | 1.57 | 0.04 |
| $Cr_2O_3$ | 1.6 | 0.01 |
| $SiO_2$ | 1.61 | — |
| ZnO | 1.81 | 0.2 |
| $TiO_2$ | 1.99 | 0.38 |
| $ZrO_2$ | 2.14 | 0.53 |
| $Bi_2O_3$ | 2.14 | 0.53 |
| $Y_2O_3$ | 2.26 | 0.65 |
| $La_2O_3$ | 2.43 | 0.82 |

Bond-radius difference=|$SiO_2$ bond radius−bond radius of each film substance|

B. Comparative Example of Different Outermost-Layer Surface Free Energy

Examples 10 to 13

Except an aspect in which 100% argon was used as the sputtering gas in the outermost-layer film formation, a similar process as that of Examples 1 to 4 was carried out and a press

TABLE 4

| | Intermediate Layer | Bond-Radius Difference (Å) | Film Thickness of Intermediate Layer (nm) | | | |
|---|---|---|---|---|---|---|
| | | | 1.5 ± 0.5 | 3.5 ± 0.5 | 5.5 ± 0.5 | 8.0 ± 0.5 |
| Ex. 1 | Zr oxide | 0.53 | OK | OK | OK | OK |
| Ex. 2 | Bi oxide | 0.53 | OK | OK | OK | OK |
| Ex. 3 | Y oxide | 0.65 | OK | OK | OK | OK |
| Ex. 4 | La oxide | 0.82 | OK | OK | OK | OK |
| Ex. 5 | Zn oxide | 0.2 | OK | OK | NG | NG |
| Ex. 6 | Ti oxide | 0.38 | OK | OK | NG | NG |
| Ex. 7 | Cr oxide | 0.01 | NG | NG | NG | NG |
| Ex. 8 | Si nitride | 0.04 | NG | NG | NG | NG |
| Ex. 9 | Si carbide | 0.05 | NG | NG | NG | NG | molding glass material in which the intermediate layer and the outermost layer were formed on the core-portion glass was obtained.

When the evaluation of the outermost layer was carried out by a similar method to that of Example 1 with respect to the press molding glass material obtained in Example 10, similarly as Example 1, it was confirmed that the outermost layer was the silicon oxide film and the film thickness thereof was 5 nm. Also, the values of the surface free energy and of the components thereof were just as shown in the following Table 6. The outermost layer was formed by similar condition and method also in Examples 11 to 13, so that the composition, the surface property and the film thickness of the formed outermost layer become similar to those of Example 10. In addition, in Examples 10 to 13, the intermediate layer was formed by similar condition and method as those of Examples 1 to 4, so that the composition and the film thickness of the intermediate layer become similar to those of Examples 1 to 4.

TABLE 6

| Surface Free Energy | Nonpolar Energy | Hydrogen Binding Energy | Dipole Energy |
|---|---|---|---|
| 78.4 mJ/m$^2$ | 35.0 mJ/m$^2$ | 41.6 mJ/m$^2$ | 1.8 mJ/m$^2$ |

By using the press molding glass material obtained in Examples 10 to 13, a glass lens including a flange portion at the circumference of the optical function portion was produced by a similar method as that of Example 1. A transmissive light was illuminated to the produced lens and existence or non-existence of a defect, which was assumed to have occurred due to fusion with the die, was judged visually. It was evaluated as "NG" for a product in which a defect was confirmed and evaluated as "OK" for a product in which a defect was not confirmed. According to the result thereof, as shown in the following Table 7, fusions with respect to the die occurred for the glass lenses obtained in Examples 10 to 13 regardless of the film thickness of the intermediate layer. On the other hand, when a similar evaluation was carried out with respect to the glass lenses obtained in Examples 1 to 9, the evaluation result was excellent for all the lenses.

optical function portion was produced by the following method.

The glass material was press-molded under an nitrogen gas atmosphere by a mold press-molding apparatus. Specifically, first, by using a molding die composed of upper and lower dies made of SiC, in which the carbon-containing mold release films were formed on the molding surfaces by a sputtering method, and composed of a die body holding these upper and lower dies coaxially, the glass material was supplied to the inside of the molding die so as to sandwich and hold the abovementioned glass material PF by the upper and lower dies. Then, the molding die was thrown inside the chamber of the molding apparatus in which the atmosphere is filled with non-oxidative $N_2$ gas, and the molding die and the glass material were heated to a temperature in a range between the deformation point Ts+40° C. and the deformation point Ts−10° C. of the glass material. Subsequently, the molding die was pressurized at 180 kg/cm$^2$ to 260 kg/cm$^2$ and concurrently, the molding die was cooled by a predetermined cooling speed and the pressurization was terminated at a time point when the temperature of the molding die became 460° C. Subsequently, the molding die was cooled rapidly and when the temperature becomes equal to or less than 180° C., the molding die was taken out from the inside of the chamber, and the molded glass body in the inside of the molding die was taken out by decomposing the molding die. The outside-diameter size $\underline{d}$ of the formed body was 21.5 mm, the center thickness was 2.65 mm, the outside-diameter changing rate by the press molding was 22.2% and the change rate of the center thickness was 18.2%.

Subsequently, centering was applied onto the peripheral portion of the press molded body by a grinding process and the non-spherical surface glass lens having a convex meniscus shape of ϕ18 mm was obtained.

When existence or non-existence of the defect caused by the fusion of the obtained glass lens was evaluated by a

TABLE 7

| | Intermediate Layer | Bond-Radius Difference (Å) | Film Thickness of Intermediate Layer (nm) | | | |
|---|---|---|---|---|---|---|
| | | | 1.5 ± 0.5 | 3.5 ± 0.5 | 5.5 ± 0.5 | 8.0 ± 0.5 |
| Ex. 10 | Zr oxide | 0.53 | NG | NG | NG | NG |
| Ex. 11 | Bi oxide | 0.53 | NG | NG | NG | NG |
| Ex. 12 | Y oxide | 0.65 | NG | NG | NG | NG |
| Ex. 13 | La oxide | 0.82 | NG | NG | NG | NG |

By using the press molding glass material obtained in Examples 10 to 13, a convex meniscus shaped glass lens without including a flange portion at the circumference of the similar method as the method mentioned above, fusion with the die occurred regardless of the film thickness of the intermediate layer as shown in the following Table 8.

TABLE 8

| | Intermediate Layer | Bond-radius Difference (Å) | Film Thickness of Intermediate Layer (nm) | | | |
|---|---|---|---|---|---|---|
| | | | 1.5 ± 0.5 | 3.5 ± 0.5 | 5.5 ± 0.5 | 8.0 ± 0.5 |
| Ex. 10 | Zr oxide | 0.53 | NG | NG | NG | NG |
| Ex. 11 | Bi oxide | 0.53 | NG | NG | NG | NG |
| Ex. 12 | Y oxide | 0.65 | NG | NG | NG | NG |
| Ex. 13 | La oxide | 0.82 | NG | NG | NG | NG |

C. Comparative Example of Different Outermost-Layer Film Thickness

Example 14

Except an aspect in which the outermost layer was formed by prolonging the sputtering time-period, a similar process as that of Example 1 was carried out and a press molding glass material in which the intermediate layer and the outermost layer were formed on the core-portion glass was obtained.

When the evaluation of the outermost layer was carried out by a similar method as that of Example 1, similarly as the abovementioned respective examples, it was confirmed that the outermost layer was the silicon oxide film and the film thickness thereof was 15 nm. Also, the values of the surface free energy and of the components thereof were similar values to those of Example 1. The intermediate layer was formed by a similar condition and a method as those of Example 1, so that the composition and the film thickness of the intermediate layer become similar to those of Example 1.

By using a press molding glass material obtained in Example 14, a glass lens including a flange portion at the circumference of the optical function portion was produced by a similar method to that of Example 1. When the shape of the produced glass lens was evaluated by a similar method to that of Example 1, as shown in the following Table 9, the evaluation result was "NG" for all the lenses regardless of the film thickness of the intermediate layer.

TABLE 9

| Intermediate Layer | Bond-Radius Difference (Å) | Film Thickness of Intermediate Layer (nm) | | | |
| --- | --- | --- | --- | --- | --- |
| | | 1.5 ± 0.5 | 3.5 ± 0.5 | 5.5 ± 0.5 | 8.0 ± 0.5 |
| Ex. 14 Zr oxide | 0.53 | NG | NG | NG | NG |

From the comparison between the abovementioned inventive example and the comparative example, deformation-defect and fusion do not occur according to the present invention even in a case in which the deformation amount in the press molding is a lot, and it can be confirmed that it becomes possible to obtain a molded glass body having a desired shape.

D. Confirmation of Influence to Outermost-Layer Surface Free Energy of Sputtering Condition

Example 15

Except an aspect in which mixed gas of oxygen and argon including oxygen with the rate shown in the following Table 9 was used as the sputtering gas in the outermost-layer film formation, a similar process to that of Example 1 was carried out and a press molding glass material in which the intermediate layer and the outermost layer were formed on the core-portion glass was obtained.

The surface free energy of the outermost layer was measured by a method similar to that of Example 1. The obtained results were shown in the following Table 10 together with the results obtained for Example 1 (oxygen adoption rate in the sputtering gas was 10 volume %) and for Example 10 (100% argon gas was used as the sputtering gas).

TABLE 10

| Oxygen Adoption Rate [volume %] | Surface Free Energy [mJ/m$^2$] | Nonpolar Energy [mJ/m$^2$] | Hydrogen Binding Energy [mJ/m$^2$] | Dipole Energy [mJ/m$^2$] |
| --- | --- | --- | --- | --- |
| 0 | 78.4 | 35 | 41.6 | 1.8 |
| 5 | 71.7 | 34.8 | 35.5 | 1.4 |
| 10 | 68.2 | 35.3 | 31.1 | 1.8 |
| 15 | 71.9 | 36 | 35.4 | 0.5 |
| 20 | 76.8 | 36 | 39.4 | 1.4 |

From the results shown in Table 10, it can be confirmed that the surface free energy of the silicon oxide film of the outermost layer can be controlled to equal to or less than 75 mJ/m$^2$ by setting the oxygen adoption rate in the sputtering gas to be equal to or more than 5 volume % and to be less than 20 volume % and that the surface free energy was possible to be controlled to equal to or less than 75 mJ/m$^2$ is caused mainly by the reduction of the hydrogen binding energy.

When the press molding was carried out by a similar method as that of Example 1 by using the press molding glass material produced on the condition that the oxygen adoption rates were 5 volume %, 15 volume % and 20 volume %, fusion with the molding die was not seen similarly to Example 1 and the like in case of using the press molding glass material produced in a condition that the oxygen adoption rate was 5 volume % or 15 volume %, but on the other hand, it was confirmed that the fusion with respect to the molding die occurs similarly as Example 10 and the like in case of using the press molding glass material produced in a condition that the oxygen adoption rate was 20 volume %.

The present invention is useful in the field for manufacturing optical elements such as a glass lens and the like.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A press molding glass material, comprising:
a core portion composed of optical glass; and
a surface layer covering the core portion,
wherein the surface layer comprises an outermost layer which contacts a molding surface of a molding die in press molding, and an intermediate layer adjacent to the outermost layer,
wherein the outermost layer is a silicon oxide film having a surface free energy measured by a three-solution method of equal to or less than 75 mJ/m$^2$ and having a film thickness of less than 15 nm,
wherein in the silicon oxide, oxide is excessive with respect to a stoichiometric composition of silicon oxide, and
wherein the intermediate layer is a film composed of a film material having a bond-radius difference from a silicon oxide based on a stoichiometric composition of more than 0.10 Å, wherein, in a case in which the bond-radius difference is more than 0.10 Å and equal to or less than 0.40 Å, a film thickness of the intermediate layer is equal to or less than 5 nm.

2. The press molding glass material according to claim 1, wherein the intermediate layer is an oxide film of zirconium, bismuth, yttrium, lanthanoid, zinc or titanium, and in a case in which the intermediate layer is the oxide film of zinc or the oxide film of titanium, the film thickness thereof is equal to or less than 5 nm.

3. The press molding glass material according to claim 1, wherein a hydrogen binding energy of the outermost layer, which is measured by the three-solution method, is equal to or less than 39.0 mJ/m$^2$.

4. The press molding glass material according to claim 1, which has a shape such that an outside-diameter changing rate calculated by formula (A):

$$\text{Outside-Diameter Changing Rate (\%)} = |1-(\text{Outside Diameter of Molded Glass Body}/\text{Outside Diameter of Press molding glass material})| \times 100 \quad \text{<Formula (A)>}$$

becomes equal to or more than 40% with respect to a molded glass body obtained by press molding.

5. The press molding glass material according to claim 1, which is used for obtaining, by press molding, a molded glass body comprising an optical function portion and a flange portion surrounding the optical function portion.

6. The press molding glass material according to claim 1, wherein the optical glass comprises at least one kind of easily reducible component selected from the group consisting of W, Ti, Bi and Nb.

7. A manufacturing method of a press molding glass material, comprising:
forming an outermost layer of the press molding glass material by carrying out a film forming process using a film formation material composed of SiO$_2$ under a mixed gas atmosphere of oxygen and an inert gas, an oxygen content rate of the mixed gas atmosphere ranging from equal to or more than 5 volume % to less than 20 volume %, wherein the press molding glass material to be manufactured is the press molding glass material according to claim 1.

8. The manufacturing method according to claim 7, further comprising forming the intermediate layer by a film forming process in an atmosphere containing oxygen.

9. The manufacturing method according to claim 7, wherein the film forming process is carried out by a sputtering method.

10. A manufacturing method of an optical element, comprising:
heating and press molding with a press molding die the press molding glass material according to claim 1 to obtain a molded glass body by press molding with the use of a press molding die; and
obtaining the optical element as the molded glass body itself or by subjecting the molded glass body to post-processing.

11. The manufacturing method according to claim 10, wherein in the press molding, the outside-diameter changing rate calculated by formula (A):

$$\text{Outside-Diameter Changing Rate (\%)} = |1-(\text{Outside Diameter of Molded Glass Body}/\text{Outside Diameter of Press molding glass material})| \times 100 \quad \text{<Formula (A)>}$$

is equal to or more than 40%.

12. The manufacturing method according to claim 10, wherein a molded glass body, which comprises an optical function portion and a flange portion surrounding the optical function portion, is obtained by the press molding.

* * * * *